(12) United States Patent
Mauchle et al.

(10) Patent No.: US 8,333,165 B2
(45) Date of Patent: Dec. 18, 2012

(54) POWDER SPRAYCOATING CONTROL SYSTEM AND ITS COMBINATION WITH POWDER FEEDING DEVICE OR WITH POWDER SPRAYCOATING DEVICE

(75) Inventors: Felix Mauchle, Abtwil (CH); Christian Marxer, Fuerstentum (LI)

(73) Assignee: ITW Gema GmbH, Gallen (CH)

( * ) Notice: Subject to any disclaimer, the term of this patent is extended or adjusted under 35 U.S.C. 154(b) by 301 days.

(21) Appl. No.: 12/681,037

(22) PCT Filed: Sep. 17, 2008

(86) PCT No.: PCT/IB2008/002426
§ 371 (c)(1),
(2), (4) Date: Mar. 31, 2010

(87) PCT Pub. No.: WO2009/047600
PCT Pub. Date: Apr. 16, 2009

(65) Prior Publication Data
US 2010/0212589 A1 Aug. 26, 2010

(30) Foreign Application Priority Data
Oct. 13, 2007 (DE) .......................... 10 2007 049 169

(51) Int. Cl.
*B05C 19/00* (2006.01)
*B05C 11/00* (2006.01)
(52) U.S. Cl. .................... 118/683; 118/308; 118/696
(58) Field of Classification Search .............. 118/683, 118/308, 309, 695, 696, 684; 239/69, 67, 239/407, 408, 329–334, 349, 351, 355, 356, 239/363; 417/86, 65, 90, 390, 46, 185, 187, 417/188, 190; 427/180
See application file for complete search history.

(56) References Cited

U.S. PATENT DOCUMENTS

| | | | |
|---|---|---|---|
| 4,284,032 A | 8/1981 | Moos et al. | |
| 4,357,900 A | 11/1982 | Buschor | |
| 6,382,521 B1 | 5/2002 | Haas | |
| 6,598,803 B1 | 7/2003 | Haas et al. | |
| 7,150,585 B2 | 12/2006 | Kleineidam et al. | |
| 2005/0158187 A1* | 7/2005 | Fulkerson et al. | 417/390 |
| 2005/0178325 A1 | 8/2005 | Herre et al. | |
| 2006/0193704 A1 | 8/2006 | Simontacchi | |

FOREIGN PATENT DOCUMENTS

| | | |
|---|---|---|
| DE | 19838276 A1 | 2/2000 |
| DE | 19838279 A1 | 2/2000 |
| DE | 20221004 U1 | 1/2005 |
| DE | 19611533 B4 | 11/2005 |
| DE | 202006015697 U1 | 3/2007 |

(Continued)

OTHER PUBLICATIONS

ISR for PCT/IB2008/002426 dated Jan. 26, 2009.
German Search Report for DE 10 2007 049 169.9 dated Jan. 30, 2008.

*Primary Examiner* — Yewebdar Tadesse
(74) *Attorney, Agent, or Firm* — Lowe Hauptman Ham & Berner LLP

(57) ABSTRACT

A powder spraycoating control system and its combination with a powder pump or with a powder spraycoating unit. The control system contains an controller programmed to alternatingly operate a powder spraycoating unit in turn containing an injector serving as the powder pump or a powder spraycoating unit containing a dense phase powder pump serving as the powder pump.

16 Claims, 2 Drawing Sheets

FOREIGN PATENT DOCUMENTS

| | | |
|---|---|---|
| EP | 0412289 B1 | 10/1993 |
| EP | 0636420 A2 | 2/1995 |
| JP | 9071325 A | 3/1997 |
| WO | 2005051549 A1 | 6/2005 |

\* cited by examiner

POWDER SPRAYCOATING CONTROL SYSTEM AND ITS COMBINATION WITH POWDER FEEDING DEVICE OR WITH POWDER SPRAYCOATING DEVICE

RELATED APPLICATIONS

The present application is national phase of International Application Number PCT/IB2008/002426, filed Sep. 17, 2008, and claims priority from, German Application Number 10 2007 049 169.9, filed Oct. 13, 2007, the disclosures of which are hereby incorporated by reference herein in their entirety.

BACKGROUND

The present invention relates to a powder spraycoating control system and its combination with a powder feed apparatus or with powder spraycoating equipment.

The present invention relates as well to such powder feed apparatus and powder spraycoating equipment that comprise an injector serving as the powder pump as well as such that comprise a dense phase powder pump.

Dense phase powder pumps comprise at least one feed chamber fitted with a powder intake valve and a powder outlet valve. The feed chamber is alternatingly connected to a vacuum source during a suction stage and to a source of conveying compressed air during a discharge stage. The vacuum from said vacuum source aspirates powder through the open powder intake valve into the feed chamber while the powder outlet valve is closed. The conveying compressed air from the source of conveying compressed air discharges powder from within the feed chamber through the open outlet valve while the intake valve is closed. Most dense phase powder pumps comprise two feed chambers operating in mutually time-staggered manner in order that alternatingly coating powder shall be aspirated each time into one feed chamber while the pertinent other feed chamber is discharging coating powder.

Different kinds of coating powder feed apparatus containing a dense phase powder pump are known for instance from the following documents which are incorporated by reference herein: JP 09/071,325 A, DE 196 11 533 B4, US 2000/0193704 A1 (=EP 1 644 131 A2), U.S. Pat. No. 7,150,585 B2 (=WO 2004/087331 A1) and US 2005/0178325 A1 (=EP 1 566 352 A2). A vacuum intake of at least one of the two feed chambers and in some embodiment modes also the compressed air intake of the feed chamber is/are fitted with a filter permeable to air but not to coating powder. The preferred filter material is a sintered one. Predominantly the powder intake and outlet valves are pinch valves.

The quantity of powder per unit time—hereafter powder rate—fed by a dense phase powder pump in particular depends on the size (volume) of the feed chamber, on the frequency at which coating powder is aspirated into the feed chamber and then discharged from it, on the magnitude of the vacuum, on the time the powder intake valve is open during suction and on the flow impedances in the powder conduits upstream of the dense phase powder pump and especially downstream of it. The flow impedances depend in particular on the length and the inside cross-section of the powder conduits, mostly powder hoses. The compressed conveying air mixes only little with the coating powder which it pushes through the powder outlet valve out of the feed chamber.

Different conditions apply to dilute phase powder pumps using injectors as the powder pump to feed the coating powder. Using a stream of conveying compressed air, a partial vacuum is generated in the injector. This partial vacuum aspirates coating powder into the conveying flow of compressed air. The mixture of powder and conveying compressed air stream moves from the injector to a target site, for instance a bin or a spray tool. The powder rate fed by the injector depends on the rate of conveying compressed air passing through the injector. Powder spraycoating equipment fitted with an injector illustratively is known from U.S. Pat. No. 4,284,032 which is incorporated by reference herein. U.S. Pat. No. 4,357,900 which is incorporated by reference herein discloses powder spraycoating equipment wherein objects to be coated are moved through a cabin wherein they are automatically coated by spray tools driven by sensors, one of such sensors notifying a control unit when an object to be coated is being moved into said cabin in order that the spray tool be activated when said object moves into the coating range of said tool. Another sensor determines the kind of object involved, the electrical signals transmitted by this second sensor determining automatically the powder rate to be deposited on said object. EP 0 412 289 B1 which is incorporated by reference herein discloses an electrostatic powder spraycoating apparatus fitted with an injector and with means keeping constant the total quantity of air fed to the spray tool and consisting of the conveying compressed air plus supplemental air that is added to the stream of powder. EP 0 636 420 A2 discloses powder spraycoating apparatus fitted with a control allowing adjusting the rate of fed powder and—depending on that adjustment and using stored functions—adjusting the rate of conveying compressed air and a rate of supplemental compressed air. Said functions are stored in graphic form.

In the state of the art, the computerized controllers used for injector-fitted powder spraycoating equipment differ from those used for powder spraycoating equipment fitted with dense phase powder pumps.

SUMMARY

The objective of the present invention is to make it feasible to reduce the number of required components.

The spraycoating control system of the present invention is programmed in a manner that it may be alternatingly used to operate powder spraycoating equipment comprising a powder pump in the form of an injector or operating powder spraycoating equipment comprising a dense phase powder pump.

Accordingly only one kind of spraycoating powder control system henceforth need being manufactured and stocked. The client moreover enjoys the advantage of needing spare parts only for one powder spraycoating control system. A further advantage is that the client is able to operate the control system identically whether said system is present at an injector-fitted powder spraycoating equipment or such equipment is fitted with a dense phase powder pump. Because the advantageous design of the control system of the present invention applies to both kinds of powder spraycoating equipment, it allows using the control system components for either kind of powder spraycoating equipment. The number of required components is lowered thereby.

Preferably the powder spraycoating equipment control system shall be one modular unit. Said unit preferably is contained in a housing.

BRIEF DESCRIPTION OF DRAWINGS

The present invention is discussed below by means of illustrative embodiment modes and in relation to the appended drawings.

Identical parts are always identically denoted in the drawings.

DETAILED DESCRIPTION

Figure 1:
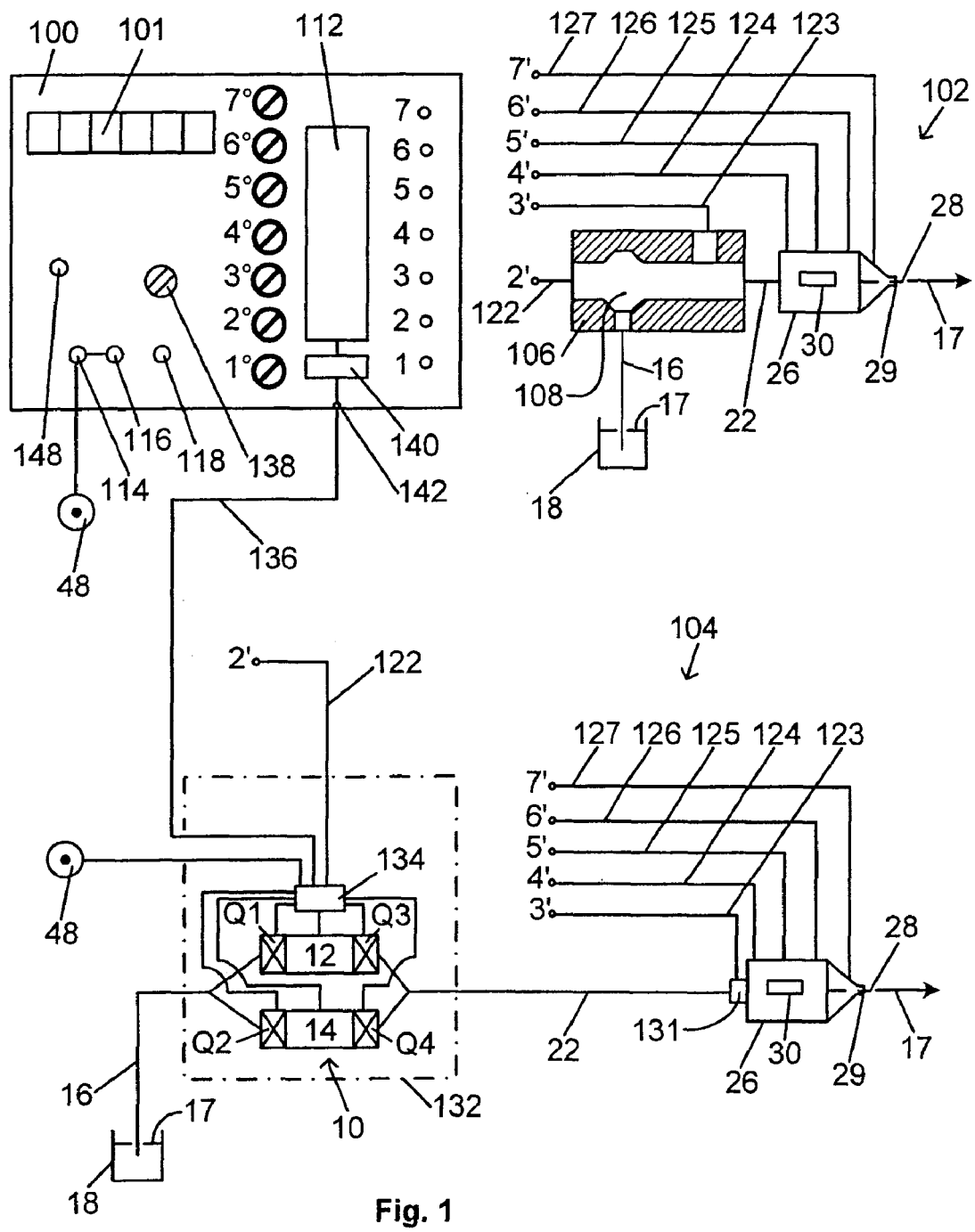
FIG. 1 schematically shows a powder spraycoating control system of the invention in combination with powder spraycoating equipment containing an injector-fitted powder pump and in combination with a powder spraycoating equipment fitted with a dense phase powder pump and FIG. 2 schematically shows a particular embodiment mode of powder spraycoating equipment of the present invention fitted with a dense phase powder pump for one possible embodiment mode, without however being restricted to it.

The powder spraycoating control system 100 schematically shown in FIG. 1 is a sub-assembly received in a housing. It is designed to alternately control a powder spraycoating unit 102 or a powder spraycoating unit 104. Both powder spraycoating units 102 and 104 may contain the same spray tool 26 or different ones. The powder spraycoating unit 102 contains an injector 106 to move coating powder 17 out of a powder bin 18 to the spray tool 26. The injector 106 comprises a partial vacuum zone 108 which can communicate by means of powder feed conduit 16 (powder suction conduit) with the powder bin 18 to aspirate powder into a stream of compressed conveying air. The stream of compressed conveying air can be fed by a compressed conveying air duct 122 to the injector 106. It aspirates powder 17 out of the powder bin 18 and moves the aspirated coating powder through a powder discharge conduit 22 to the spray tool 26 from where it exits from a spray aperture 29 in the form of a spray jet.

The control system 100 preferably is fitted with one or more display segments 101 to optically display operational values, for instance setpoints and/or actual (measured) values.

The spray tool 26 preferably contains a high voltage (hv) generator 30, which in other embodiment modes also may be configured externally on the spray tool 26, generating hv for at least one hv electrode 28 that is situated in or near the path of the coating powder 17 and serving to electrostatically charge it.

The control system 100 moreover contains a computerized controller 112 to alternatingly drive the powder spraycoating unit 102 or the powder spraycoating unit 104. The computerized controller 112 is programmed to alternatingly drive either the powder spraycoating unit 102 or the other powder spraycoating unit 104. In this manner elements of the computerized controller 112 may be designed and configured both to operate one of the powder spraycoating units fitted with the injector 106 or the other fitted with the dense phase powder pump 10.

The controller 112 may be switched between operating the powder spraycoating unit 102 and operating the other unit 104.

The control system 100 contains an electric power input (current/voltage connection) 118 receiving electric power.

The control system 100 is fitted with an electric power output 6 to apply a low voltage (lv) to the hv generator 30 of the spray tool 26. The lv at the lv output 6 is generated by the controller 112 by means of the electrical power at the power input 118 as a function of the hv setpoint at an hv setpoint of the control system 100.

The connecting end 6' of an lv voltage cable 126 can be connected to the power output 6 of the control system 100 to apply lv to the hv generator 30.

The control system 100 contains a compressed air intake 114 which can be connected to a compressed air source 48 and may also comprise a compressed air outlet 116 loaded by the same pressure.

The control system 100 also contains a powder setpoint element $2^0$ where the setpoints of the powder rate can be adjusted which is to be fed to the spray tool 26 from the powder spraycoating unit 102 containing the injector 106 acting as the powder pump, and from the other powder spraycoating unit 104 containing the dense phase powder pump 10. Alternatively one or the other of the powder spraycoating units 102 and 104 may be connected to the control system 100.

Compressed conveying air can be tapped at a compressed conveying air output 2 of the control system 100 as a function of the set point of powder rate adjusted by the powder setpoint element $2^0$. The controller 112 calculates the setpoint—depending on the powder rate setpoint adjusted at the powder adjusting element $2^0$—required for the pertinent rate of compressed conveying air for both powder spraycoating units 102 and 104.

In one preferred embodiment mode of the present invention, the controller 112 also calculates, again as a function of setpoint adjusted at the powder adjusting element $2^0$, the pumping frequency of the dense phase powder pump 10.

The powder adjusting element $2^0$ is used both to adjust the setpoint of the powder rate of one (102) of the powder spraycoating units as well as of the other (104). In another embodiment mode, separate powder adjusting elements may be provided for two powder spraycoating units 102 and 104.

A hookup end 2' of the compressed conveying air conduit 122 connected to a conveying air intake of the injector 106, or a hookup end 2' of another compressed conveying air conduit 122 connected to a pneumatic circuit 134 of the dense phase powder pump 10 of the other powder spraycoating unit 104, is alternatingly connectable to the compressed conveying air outlet 2 of the control system 100.

The spray tool 26 may be designed in a manner that the coating powder is atomized using air supplied to the atomizer, and in such a design, the control system 100 may be fitted with an atomizer air outlet 4 to which may be connected the hookup end 4' of an atomizer air conduit 124 feeding compressed atomizer air to the spray tool 26. The setpoint of the compressed atomizer air is determined by the controller 112 and preferably is variably adjustable by an atomizer air adjusting element $4^0$.

When the spray tool 26 is fitted with an electrode-rinsing compressed air duct for the electrode 28 to prevent coating powder from adhering on the minimum of one electrode, the system 100 may comprise an atomizer compressed air outlet 5 from which a rate of electrode compressed air defined by the controller 112 may be tapped by connecting the hookup end 5' of an electrode rinsing air conduit 125 to the said electrode air hookup. The electrode rinsing air may be adjusted by an electrode rinsing air adjusting element $5^0$ at the control system 100.

When the spray tool 26 is fitted with one or more shaping compressed air ducts to shape the rinsing air jet by means of such compressed air, the control system 100 also may then be fitted with a shaping compressed air outlet 7 which can be connected to the hookup end 7' of a shaping compressed air conduit 127 of the spray tool 26. The shaping compressed air is defined by the computerized controller 112. Preferably the control unit comprises a shaping compressed air adjusting element $7^0$ to adjust said compressed air.

As shown in FIG. 1, the two powder spraycoating units 102 and 104 may be alternately connected by means of the conduits 122, 124, 125, 126 and/or 127 to the corresponding hookup elements 2, 4, 5, 6 respectively 7 of the control system 100 in order to be driven by it.

Preferably the control system 100 comprises a supplemental compressed air outlet 3 at which a rate of supplemental compressed air adjusted by the controller 112 may be tapped. The control system 100 may comprise a supplemental compressed air adjusting element 3° to adjust the setpoint of the rate of additional compressed air. However, in the preferred embodiment mode of the present invention, instead of the supplemental compressed air adjusting element 3°, a total-air adjusting element 3° is present at the control system 100 to adjust a setpoint for the total compressed air rate composed of a rate of compressed conveying air and a rate of supplemental compressed air. For that purpose the controller 112 may be designed in a manner that, depending on the adjustments at the powder adjusting element 2°, it calculates the rate of compressed conveying air and makes it available at the compressed conveying air outlet 2 and in that, depending on this rate of compressed conveying air and the adjustment at the total air adjusting element 3°, it calculates the rate of supplemental compressed air and adjusts it at the total compressed air outlet 3 in a manner that the rate of total compressed air always corresponds to the setpoint adjusted at the total air adjusting element 3°.

The connection end 3' of a supplemental compressed air conduit 123 may be connected to the supplemental compressed air outlet 3 of the control system 100 to feed supplemental compressed air at the powder spraycoating unit 102 into the powder stream downstream of the partial vacuum zone 108 of the injector 106 or, at the powder spraycoating unit 104 to the powder path at a site between the dense phase powder pump 10 and the spray aperture 19 of the spray tool 26, for instance and preferably at the powder intake 131 at the rear end of the spray tool 26 where the powder discharge conduit 22 is connected to the spray tool 26.

The powder feed apparatus of the powder spraycoating unit 102 essentially is constituted only by the injector 106 and elements such as pressure regulators and/or valves in the control system 100.

As regards the powder spraycoating unit 104, the powder feed apparatus 132 may consist of the dense phase powder pump 10 and a pneumatic circuit 134 containing a plurality of one or more pressure regulators. The pneumatic circuit 134 is driven by the control system 100 transmitting control signals from the controller 112, said signals being sent from the control system 100 to the pneumatic circuit 134, for instance in wireless manner or using a cable or a BUS system, for instance a CAN system. a Profi BUS system or another, said transmission means being symbolically shown in FIG. 1 by a signal line 136. A number of possibilities are open.

In one design, the signal line 136 can be directly connected to the controller 112. In that case the controller 112 shall be advantageously switched by a two-way switch 138 between operating the powder spraycoating unit 102 and operating the powder spraycoating unit 104. In other embodiment modes the controller 112 is designed to automatically detect the connection of the signal line 136 and then to automatically switch for instance from operating the powder spraycoating unit 102 to operating the powder spraycoating unit 104, and, once the signal line 136 is disconnected again, switching back from operating the powder spraycoating unit 104 to operating the powder spraycoating unit 102.

An adapter 140 is provided in the preferred embodiment mode of the present invention shown in FIG. 1, said adapter being fitted with a signal output 142 which may be connected to the signal line 136 (or a BUS or other system). The adapter can be affixed to system 100 or, in a preferred embodiment mode, it may be integrated into it, and be connectable to the controller 112. Instead of using a signal line or a BUS connection, said adapter 140 also may be wireless to transmit wirelessly the control signals to a receiver of the pneumatic circuit 134.

In the preferred embodiment mode of the present invention, the controller 112 is designed in a manner that it detects whether the adapter 140 is connected to it or not, said and when detecting connection automatically, it switches to operating the powder spraycoating unit 104 containing the dense phase powder pomp 10, and in the event of disconnected adapter 140, it automatically switches to operating the spraycoating unit 102 containing the injector 106 functioning as a powder pump.

In another embodiment mode of the present invention, the alternatively integrated adapter 140 is still used, however the computerized controller 112 is not designed to automatically switch between the powder spraycoating units 102 and 104, instead such action is implemented by a two-way switch 138.

The compressed conveying air conduit 122 of the dense phase powder pump 10 of the powder spraycoating unit 104 is connected to the pneumatic circuit 134.

The dense phase powder pump 10 of the powder spraycoating unit 104 contains at least one, preferably two feed chambers 12 and 14 which alternatingly aspirate coating powder 17 out of the powder bin 18 and feed aspirated coating powder through the powder discharge conduit 22 to the spray tool 26. Each feed chamber 12 and 14 contains a powder intake valve Q1 respectively Q2 and a powder outlet valve Q3 respectively Q4. These powder valves Q1, Q2, Q3 and Q4 preferably are pinch valves. They are driven by the control system 100 by means of the pneumatic circuit 134 as a function of the control signals from the controller 112. The feed chambers 12 and 14 are alternatingly loaded by the pneumatic circuit 134 with a vacuum or with compressed conveying air depending on the control signals from the controller 112.

To deliver the vacuum, preferably the pneumatic circuit 134 contains a vacuum source 44 as illustratively shown in FIG. 2. In another embodiment mode, a different vacuum source might be used. Also, a control system 100 may comprise a vacuum hookup 1 from which the vacuum would be delivered.

The magnitude of the (partial) vacuum may be adjusted for instance by a vacuum adjusting element 1$^{O}$ at the control system 100.

In still another embodiment mode of the present invention, the control system 100 may be fitted additionally with or instead one or more or all the adjusting elements 1$^{O}$ through 7$^{O}$ with signal inputs receiving corresponding setpoint signals transmitted by an overriding control means, for instance by a cable or in wireless manner or by a BUS system, for instance a CAN or a Profi BUS system or another system.

The spray tool 26 may be a manually operated spray gun or be controlled automatically.

FIG. 2 shows a particular embodiment mode of a powder spraycoating unit 104 fitted with a dense phase powder pump 10, though such an embodiment does not limit the present invention. Instead of the particular single air exchange aperture 12.3 respectively 14.3, the alternating loading of the feed chambers 12 and 14 may be implemented in this instance through a separate vacuum hookup and a compressed air hookup.

The dense phase powder pump 10 contains at least one, preferably two feed chambers 12 respectively 14 within a pump part or cylinder A respectively B. A powder intake valve Q1 respectively Q2 is mounted to a powder intake 12.1 respectively 14.1 of the feed chambers 12 and 14. Powder outlet valves Q3 and Q4 are mounted on a powder outlet 12.2 respectively 14.2 of the feed chambers 12 and 14. The powder intake valves Q1 and Q2 and the powder outlet valves Q3 and Q4 are preferably mounted directly on or in the powder intake 12.1 respectively 14.1 respectively the powder outlet 12.2 or 14.2. Merely for clarity they are shown in FIG. 2 being conceptually spaced from the powder intake respectively powder outlet.

Figure 2:
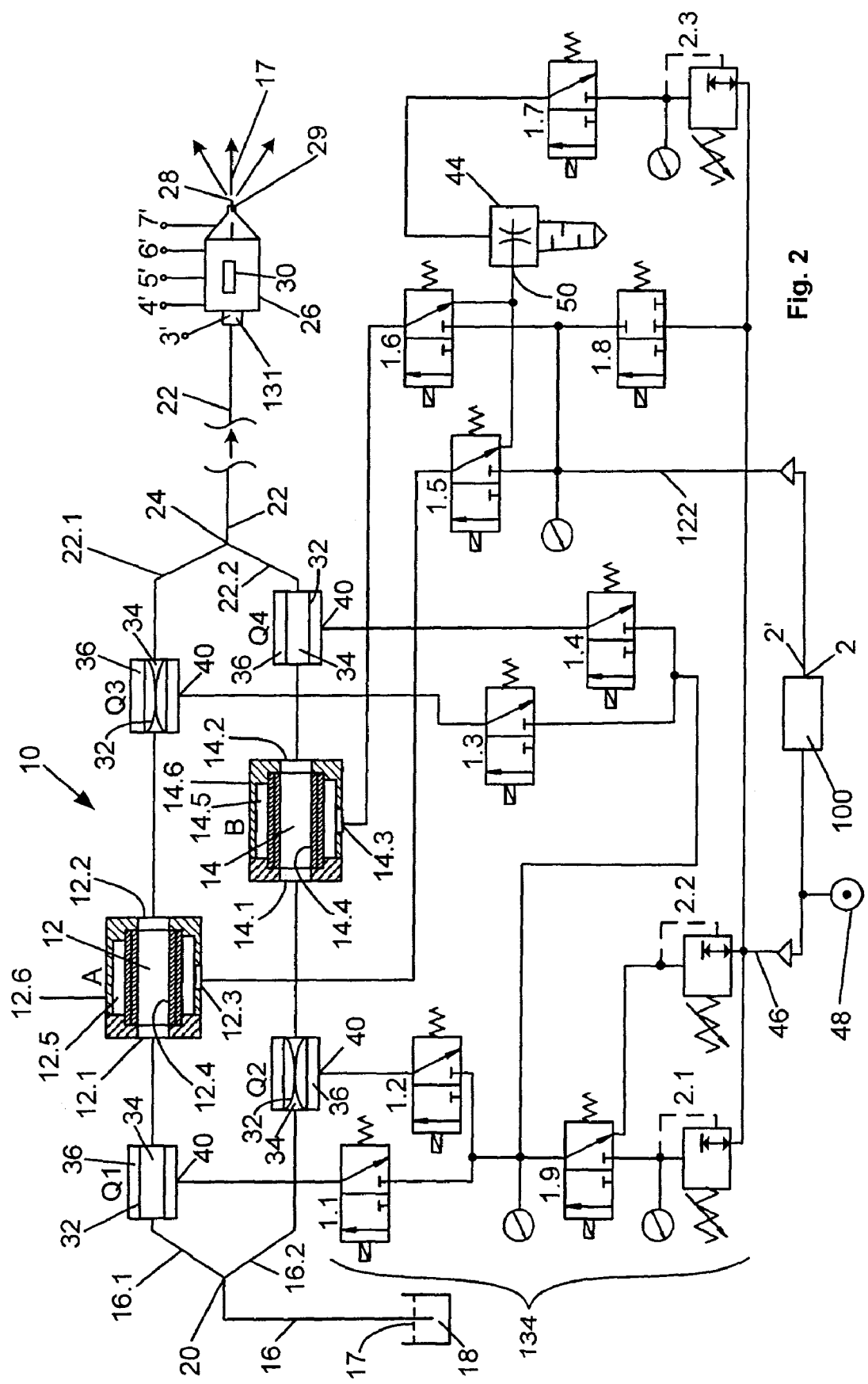

Powder feed conduits 16.1 and 16.2 are connected to the intake side of the powder intake valves Q1 and Q2 and may lead separately to one or two powder bins 18, or, as shown in FIG. 2, they may be connected by a branch 20 to the common powder feed conduit 16 leading into the powder bin 18.

Each feed chamber 12 respectively 14 can be connected during a suction phase to a vacuum source 44 or during a discharge phase to a source 48 of compressed conveying air. Using the vacuum from the source 44, coating powder 17 is aspirated through the open powder intake valve Q1 respectively Q2 into the feed chamber 12 or 14 while the powder outlet valve Q3 or Q4 is closed. By means of the compressed conveying air from the source 48, the powder in the feed chamber 12 respectively 14 is discharged through the open powder outlet valve Q3 or Q4 while the powder intake valve Q1 or Q2 is closed. The two feed chambers 12 and 14 operate in mutually time-staggered manner whereby alternatingly either feed chamber 12 or 14 receives aspirated coating powder while the other feed chamber 14 respectively 12 discharges coating powder.

FIG. 2 shows the feed chamber 12 in its suction stage during which its powder intake valve Q1 is open and its powder outlet valve Q3 is closed. The other feed chamber 14 is in its powder discharge stage during which its powder intake valve Q2 is closed and its powder outlet valve Q4 is open.

The powder intake valves Q1 and Q2 are fed by means of control valves 1.1 and 1.2 alternatingly with compressed air from the compressed air source 48 or they may be vented into the external atmosphere (or be connected to the vacuum). The powder outlet valves Q3 and Q4 can be alternatingly loaded with the compressed air from the compressed air source 48 or be vented (or connected to the vacuum) by means of control valves 1.3 and 1.4 Preferably a pressure regulator 2.2 is configured between the control valves 1.1, 1.2, 1.3 and 1.4 on one hand and the compressed air source 48 on the other. In the preferred embodiment mode shown in FIG. 2, a second pressure regulator 2.1 is configured in parallel with the pressure regulator 2.2 and either one of said two pressure regulators can be connected by a further control valve 1.9 to the control valves 1.1, 1.2, 1.3 and 1.4. In this manner the powder valves Q1, Q2, Q3 and Q4 can be alternatingly supplied with compressed air at the pressure of the pressure regulator 2.2 or at that of the other pressure regulator 2.1

The alternative loading of the feed chamber 12 respectively 14 with vacuum or compressed air is implemented through an air exchange aperture 12.3 respectively 14.3 in a housing 12.6 or 14.6 communicating by means of an annular chamber 12.5 respectively 14.5 and a filter 12.6 respectively 14.6 with the feed chamber 12 or 14. The filter 12.4 and 14.4 is permeable to a gas, in particular compressed air, but not to the particles of the coating powder. Preferably the filters 12.4 and 14.4 constitute the respective peripheral walls of the feed chambers 12 and 14.

The air exchange apertures 12.3 and 14.3 can be alternatingly connected by control valves 1.5 and 1.6 to the compressed air source 48 or to the vacuum source 44.

Moreover a control valve 1.8 may be used to connect the air exchange hookups 12.3 respectively 14.3 directly to the compressed air source 48 instead of through a pressure regulator.

The compressed air conveying conduit 122 connects the control system 100 to the control valves 1.5 and 1.6. Compressed air conduits 46 connect the compressed air source 48 to the pressure regulators 2.1 and 2.2.

Illustratively the vacuum source 44 may comprise an injector wherein a stream of compressed air generates a vacuum in a vacuum hookup 50. The compressed air stream illustratively may be fed through a pressure regulator 2.3 and a control valve 1.7 to the vacuum injector 44. The pressure regulator 2.3 is connected by means of the compressed air conduit 46 to the compressed air source 48. All control valves 1.1, 1.2, 1.3, 1.4, 1.5, 1.6, 1.7, 1.8 and 1.9 are driven by the control system 100.

The invention claimed is:

1. A powder spray-coating control system for driving powder spray-coating units, each spray-coating unit containing a powder pump and a powder spray tool, the spray-coating units including a first powder spray-coating unit which contains an injector as the powder pump and a second powder spray-coating unit which contains a dense phase powder pump as the powder pump, said powder spray-coating control system comprising:
    a controller programmed to alternatingly operate the first powder spray-coating unit and the second powder spray-coating unit, the controller being switchable to either of the first and second powder spray-coating units;
    a powder adjusting element configured to adjust a set-point of a powder rate to be delivered, by means of compressed conveying air, from the powder pump of the powder spray-coating unit being operated by the controller to the corresponding powder spray tool, the controller being configured to calculate a rate of the compressed conveying air as a function of the set point of the powder adjusting element;
    an electric power input configured to feed electric power to the control system; and
    a compressed air intake.

2. The powder spray-coating control system as claimed in claim 1, further comprising:
    a common compressed conveying air outlet for both powder spray-coating units and configured to supply, as a function of a particular operation by the controller, the compressed conveying air to the first powder spray-coating unit or to the second powder spray-coating unit.

3. The powder spray-coating control system as claimed in claim 1, further comprising:
    a two-way switch for switching the controller between operating the first powder spray-coating unit and operating the second powder spray-coating unit.

4. The powder spray-coating control system as claimed in claim 1, further comprising:
    an adapter operationally connectable to the controller,
    wherein the controller is configured to
        automatically detect whether the adapter is or is not connected to the controller,
        automatically switch to operating the first powder spray-coating unit when the adapter is disconnected from the controller, and
        automatically switch to operating the second powder spray-coating unit when the adapter is connected to the controller.

5. The powder spray-coating control system as claimed in claim 1, comprising only one said powder adjusting element for both powder spray-coating units.

6. The powder spray-coating control system as claimed in claim 1, further comprising:
an electrical power output configured to apply a low voltage to at least one high voltage electrode of the powder spray tool of the powder spray-coating unit being operated by the controller,
wherein the controller is configured to generate the low voltage from the electrical power at the electrical power input.

7. The powder spray-coating control system as claimed in claim 1, further comprising:
a supplemental compressed air outlet configured to feed supplemental compressed air into a powder path between the powder pump of the powder spray-coating unit being operated by the controller and a powder spray outlet of the corresponding power spray tool, to control a powder stream upstream of the powder spray outlet; and
a total air adjusting element configured to adjust a set-point of a rate of total compressed air composed of the rate of the compressed conveying air plus a rate of the supplemental compressed air,
wherein the controller is configured to, in response to a change in a set-point of the rate of the compressed conveying air, automatically change the rate of the supplemental compressed air to maintain the rate of the total compressed air approximately constant.

8. The powder spray-coating control system as claimed in claim 1, further comprising:
the injector or the dense phase powder pump.

9. The powder spray-coating control system as claimed in claim 1, further comprising:
the first powder spray-coating unit or the second powder spray-coating unit.

10. A powder spray-coating control system, comprising:
first and second powder spray-coating units each containing a powder pump and a powder spray tool, wherein the first powder spray-coating unit contains an injector as the powder pump and the second powder spray-coating unit contains a dense phase powder pump as the powder pump;
a controller programmed to alternatingly operate the first powder spray-coating unit and the second powder spray-coating unit, the controller being switchable to either of the first and second powder spray-coating units; and
a powder adjusting element configured to adjust a set-point of a powder rate to be delivered, by means of compressed conveying air, from the powder pump of the powder spray-coating unit being operated by the controller to the corresponding powder spray tool,
wherein the controller is configured to calculate a rate of the compressed conveying air as a function of the set-point of the powder adjusting element.

11. The powder spray-coating control system as claimed in claim 10, further comprising:
a compressed conveying air intake for receiving the compressed conveying air; and
a common compressed conveying air outlet for both powder spray-coating units and configured to supply, as a function of a particular operation by the controller, the compressed conveying air to the first powder spray-coating unit or to the second powder spray-coating unit.

12. The powder spray-coating control system as claimed in claim 10, further comprising:
a two-way switch for switching the controller between operating the first powder spray-coating unit and operating the second powder spray-coating unit.

13. The powder spray-coating control system as claimed in claim 10, further comprising:
an adapter connectable to the controller,
wherein the controller is configured to
automatically detect whether the adapter is or is not connected to the controller,
automatically switch to operating one of the first and second powder spray-coating units when the adapter is disconnected from the controller, and
automatically switch to operating the other of the first and second powder spray-coating units when the adapter is connected to the controller.

14. The powder spray-coating control system as claimed in claim 10, comprising one said powder adjusting element for both powder spray-coating units.

15. The powder spray-coating control system as claimed in claim 10, further comprising:
an electric power input configured to feed electric power to the control system; and
an electrical power output configured to apply a low voltage to at least one high voltage electrode of the powder spray tool of the powder spray-coating unit being operated by the controller,
wherein the controller is configured to generate the low voltage from the electrical power at the electrical power input.

16. The powder spray-coating control system as claimed in claim 10, further comprising:
a supplemental compressed air outlet configured to feed supplemental compressed air into a powder path between the powder pump of the powder spray-coating unit being operated by the controller and a powder spray outlet of the corresponding power spray tool, to control a powder stream upstream of the powder spray outlet; and
a total air adjusting element configured to adjust a set-point of a rate of total compressed air composed of the rate of the compressed conveying air plus a rate of the supplemental compressed air,
wherein the controller is configured to, in response to a change in the rate of the compressed conveying air, automatically change the rate of the supplemental compressed air to maintain the rate of the total compressed air approximately constant.

* * * * *